March 2, 1965   W. ECKOLD   3,171,303
MANUALLY OR POWER DRIVEN APPARATUS FOR THE UPSETTING
OF SHEET METALS OR PROFILES
Filed June 13, 1961
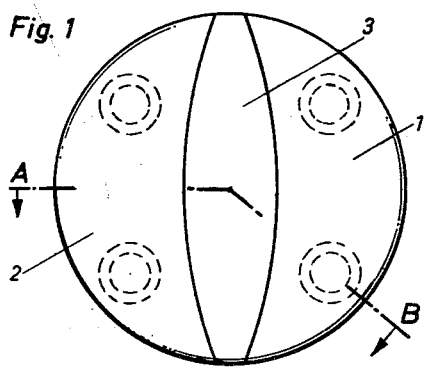
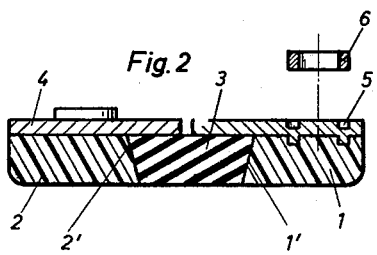
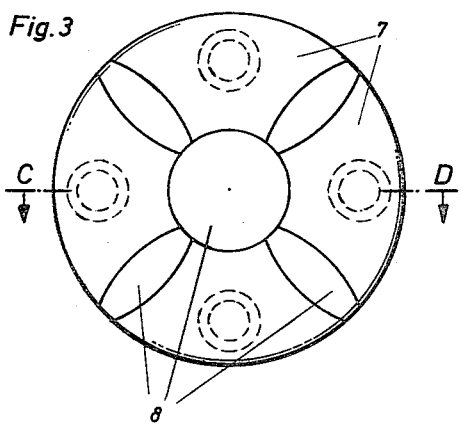
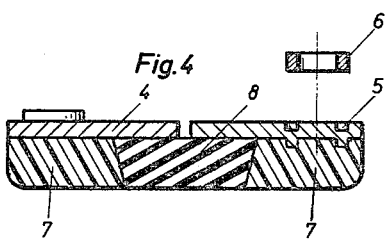
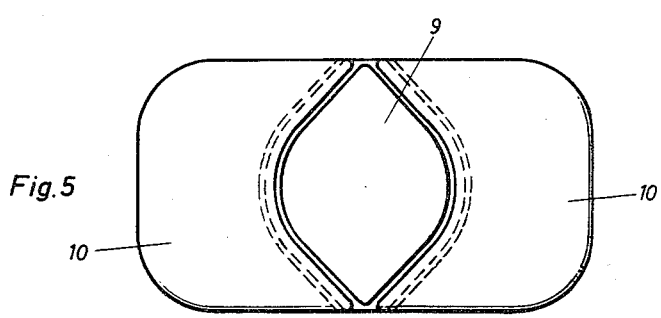
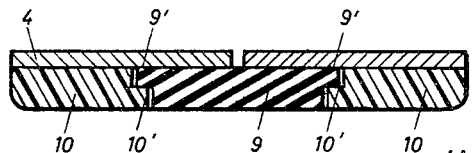
*Inventor:*
W. Eckold
By Watson, Cole, Grindle & Watson
*Attys.*

3,171,303
MANUALLY OR POWER DRIVEN APPARATUS FOR THE UPSETTING OF SHEET METALS OR PROFILES
Walter Eckold, St. Andreasberg-Sperrluttertal, Oberharz, Germany
Filed June 13, 1961, Ser. No. 116,855
Claims priority, application Germany, June 15, 1960, E 19,486
1 Claim. (Cl. 78—61)

The present invention relates to a manually or power driven apparatus for the upsetting of sheet metals or profiles as a workpiece and consisting of a bottom and a top tool, which upon a vertical pressure application, will clamp the workpiece between each other, and by means of a movement of the clamping jaws, effect the upsetting of the workpiece, the clamping jaws being provided with pressure plates made of plastic material according to the U.S. application Serial No. 660,340, now abandoned.

The present invention is based on the concept to adapt the width and configurations of the upsetting zone between the inner rims of the pressure plate to deform workpieces or materials, without however interfering with the upsetting effect or having to tolerate wrinkle formation in the workpiece because of the broadening of the upsetting zone.

As above stated, the invention resides in that by the inner rims of the pressure plates restricted upsetting zone in its form are adapted to be formed in respect to the most favorable deformation conditions of the workpiece and materials, while the intermediate space between the inner rims of the pressure plates are filled by smoothing members of elastic material. This intermediate space, that is the upsetting zone, can be of any desired shape and can have an elliptical or circular shape. By such a closed shape there is prevented the flow of elastic material towards the exterior, so that also no wrinkle formation can occur. During the upsetting step of the pressure plates as to the clamping jaws of the tools, there is effected a compression of the elastic smoothing member and thus a perfect pressing of its contact surfaces onto the workpiece.

In certain cases it may be advantageous to insert the smoothing member initially under prestressing between the pressure plates. To the pressure plates themselves there can also be made certain refinements such as undercuts, in order to thus prevent the conically shaped smoothing members from dropping out.

The subject matter of the present invention is illustrated in the drawing in exemplified form and will be described in greater detail in connection with this drawing, in which:

FIG. 1 is a plan view of one form of the invention of an upsetting tool,

FIG. 2 is a cross section taken on line A–B of FIG. 1 in the direction of the arrows, FIG. 3 is a plan view of a modified form of upsetting tool, FIG. 4 is a cross section taken on line C–D of FIG. 3 in the direction of the arrows, FIG. 5 is a plan view of a further modified form of upsetting tool, and FIG. 6 is a cross section of the tool of FIG. 5.

FIGURES 1 and 2 show an embodiment of the invention in which the inner rims of the pressure plates 1, 2 form a restricted deformation zone of an elliptical form. The pressure plates 1, 2 are provided with undercut 1', 2' between which the elliptically formed smoothing member 3 is provided by means of an adhesively bonded steel sole plate 4 as a structural unit, while small cylinders 6, partly engaging in the groove 5, of the steel sole plate 4, form the connecting elements as a jaw member.

FIGURES 3 and 4 show an embodiment in which the four pressure plates 7 are arranged in annular form, each with facing rims also forming elliptical upsetting zones and abutting in the center of the circular tool to receive a circular elastic smoothing member 8. These upsetting zones are provided with elliptical smoothing members 8 as is the case in the above described embodiment.

FIGURES 5 and 6 show an embodiment in which a smoothing member 9 is provided as an upsetting zone having a partially rounded off rectangular form. The inner rims of the pressure plates 10 have a form, which in this case is also combined with a steel sole plate 4 to form a structural unit. The smoothing member 9 is undercut with lateral rims 9' so that the protruding rims 10' of the pressure plates 10 will project over the rims 9', thus preventing any dropping out of the smoothing member.

What I claim is:

An apparatus for the upsetting and stretching of sheet metal having a bottom tool and a top tool which upon bringing the two tools toward each other with a workpiece between them the latter will be upset, each tool comprising at least two plates with undercut faces opposing each other which faces have curved surfaces, and a smoothing member totally deposed between said faces and composed of an elastic material and contacting the undercut edges of the plates by means of curved surfaces similar to the curved surfaces of the plates and the curved surfaces are elliptical in plan view.

References Cited by the Examiner
FOREIGN PATENTS

| | | |
|---|---|---|
| 541,170 | 9/55 | Belgium. |
| 1,177,063 | 4/59 | France. |
| 839,871 | 6/60 | Great Britain. |
| 87,891 | 4/58 | Netherlands. |

WILLIAM J. STEPHENSON, *Primary Examiner.*

RICHARD H. EANES, WILLIAM W. DYER, JR., CHARLES W. LANHAM, *Examiners.*